(12) United States Patent
George (10) Patent No.: US 9,853,971 B2
(45) Date of Patent: Dec. 26, 2017

(54) PROXIMITY BASED AUTHENTICATION USING BLUETOOTH

(71) Applicant: VMware, Inc., Palo Alto, CA (US)

(72) Inventor: Moses George, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 67 days.

(21) Appl. No.: 14/673,095

(22) Filed: Mar. 30, 2015

(65) Prior Publication Data

US 2016/0294822 A1    Oct. 6, 2016

(51) Int. Cl.
*H04L 29/06* (2006.01)
*H04W 12/06* (2009.01)

(52) U.S. Cl.
CPC .......... *H04L 63/0861* (2013.01); *H04L 63/18* (2013.01); *H04W 12/06* (2013.01)

(58) Field of Classification Search
CPC ....................................................... G06F 21/31
See application file for complete search history.

(56) References Cited

U.S. PATENT DOCUMENTS

| | | | |
|---|---|---|---|
| 8,079,068 B2 | 12/2011 | Adams | |
| 8,112,794 B2 * | 2/2012 | Little | H04L 63/0853 726/9 |
| 8,429,726 B2 | 4/2013 | Cahill | |
| 8,782,766 B1 * | 7/2014 | Metke | G06F 21/41 726/8 |
| 2008/0019573 A1 * | 1/2008 | Baltatu | G06F 21/32 382/115 |
| 2008/0162943 A1 * | 7/2008 | Ali | G07C 9/00158 713/185 |
| 2009/0044260 A1 | 2/2009 | Niglio | |
| 2014/0068744 A1 * | 3/2014 | Bran | G06F 21/445 726/9 |
| 2016/0036854 A1 * | 2/2016 | Himawan | H04L 63/20 726/5 |
| 2016/0234220 A1 | 8/2016 | Wolman | |

OTHER PUBLICATIONS

Non-Final Office Action dated Dec. 17, 2015, relating to U.S. Appl. No. 14/673,126.
Office Action dated Aug. 3, 2016, for U.S. Appl. No. 14/673,126.
Final Office Action dated May 11, 2016, for U.S. Appl. No. 14/673,126.
Final Office Action dated Jan. 12, 2017 in U.S. Appl. No. 14/673,126.

* cited by examiner

*Primary Examiner* — Kambiz Zand
*Assistant Examiner* — Thanh Le (57) ABSTRACT

Techniques for securing communications between fixed devices and mobile devices. A mobile device management server mediates communications between the fixed device and mobile device. The mobile device management server enrolls mobile devices and then assists with pairing the mobile devices to fixed devices in an out-of-band manner. This enrollment, coupled with out-of-band pairing, improves the speed and security of authenticating communication between fixed and mobile devices. If the mobile device has appropriate capabilities, the mobile device management server may request that the mobile device obtain and verify biometric data from a user prior to enrollment and performing authentication procedures.

20 Claims, 8 Drawing Sheets

PROXIMITY BASED AUTHENTICATION USING BLUETOOTH

BACKGROUND

Short range wireless computer networks (or "local wireless networks" herein) such as BLUETOOTH are useful for providing communications between computing devices without being subject to the limitations of larger, "infrastructure-like" computer networks (or "infrastructure networks" herein) such as a local area network (LAN) or a global computer network such as the Internet. More specifically, communication between devices on such local wireless networks may occur without the devices being connected to such infrastructure networks. Additionally, even if connected to such infrastructure networks, the communication between the devices are not subject to the bandwidth and latencies associated with such infrastructure networks when communicating via the local wireless networks.

Typically, in order to secure communications between two devices communicating via short range wireless computer networks, an operation referred to as "pairing" is performed. Pairing generally involves the exchange of security data that allows for the two communicating devices to encrypt communications transmitted wirelessly if desired and to verify identities. Unfortunately, pairing is not an instantaneous process and generally involves several back-and-forth communications. Additionally, in-band pairing, which is pairing that occurs by way of token exchange within the channel (i.e., via the local wireless network) over which communications will occur, may be subject to security attacks.

SUMMARY

A method for securing communications between a fixed device and a mobile device. The method includes verifying enrollment credentials received from the mobile device. The method also includes obtaining a first security token associated with a BLUETOOTH subsystem of the mobile device. The method further includes obtaining a second security token associated with a BLUETOOTH subsystem of the fixed device. The method also includes performing an out-of-band pairing between the fixed device and the mobile device based on the first security token, and the second security token.

A method for securing communications between a fixed device and a mobile device. The method includes performing an enrollment operation that comprises verifying enrollment credentials received from the mobile device. The method also includes requesting that the mobile device verify first biometric data. The method further includes receiving an indication from the mobile device that the first biometric data is verified. The method also includes obtaining a first security token associated with the mobile device and a first security certificate associated with the mobile device from the mobile device. The method further includes obtaining a second security token associated with the fixed device and a second security certificate associated with the fixed device from the fixed device. The method also includes performing an out-of-band pairing between the fixed device and the mobile device based on the first security token, the first security certificate, the second security token, and the second security certificate.

A system for securing communications between a fixed device and a mobile device is provided. The system includes a mobile device management server. The mobile device management server is configured to verify enrollment credentials received from the mobile device. The mobile device management server is also configured to obtain a first security token associated with a BLUETOOTH subsystem of the mobile device from the mobile device. The mobile device management server is further configured to obtain a second security token associated with a BLUETOOTH subsystem of the fixed device from the fixed device. The mobile device management server is also configured to perform an out-of-band pairing between the fixed device and the mobile device based on the first security token, and the second security token.

A system for securing communications between a fixed device and a mobile device is provided. The system includes a mobile device management server. The mobile device management server is configured to perform an enrollment operation that comprises verifying enrollment credentials received from the mobile device. The mobile device management server is also configured to request that the mobile device verify first biometric data. The mobile device management server is further configured to receive an indication from the mobile device that the first biometric data is verified. The mobile device management server is also configured to obtain a first security token associated with the mobile device and a first security certificate associated with the mobile device from the mobile device. The mobile device management server is further configured to obtain a second security token associated with the fixed device and a second security certificate associated with the fixed device from the fixed device. The mobile device management server is also configured to perform an out-of-band pairing between the fixed device and the mobile device based on the first security token, the first security certificate, the second security token, and the second security certificate.

A non-transitory computer-readable medium storing instructions that, when executed by a processor, cause the processor to perform a method. The method includes verifying enrollment credentials received from the mobile device. The method also includes obtaining a first security token associated with a BLUETOOTH subsystem of the mobile device. The method further includes obtaining a second security token associated with a BLUETOOTH subsystem of the fixed device. The method also includes performing an out-of-band pairing between the fixed device and the mobile device based on the first security token, and the second security token.

A non-transitory computer-readable medium storing instructions that, when executed by a processor, cause the processor to perform a method. The method includes performing an enrollment operation that comprises verifying enrollment credentials received from the mobile device. The method also includes requesting that the mobile device verify first biometric data. The method further includes receiving an indication from the mobile device that the first biometric data is verified. The method also includes obtaining a first security token associated with the mobile device and a first security certificate associated with the mobile device from the mobile device. The method further includes obtaining a second security token associated with the fixed device and a second security certificate associated with the fixed device from the fixed device. The method also includes performing an out-of-band pairing between the fixed device and the mobile device based on the first security token, the first security certificate, the second security token, and the second security certificate.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

An authentication system is described herein that facilitates secure pairing and communications between devices that communicate via a local wireless network such as BLUETOOTH. The authentication system generally allows a user to "enroll" a device with a secure management server over an infrastructure network such as the Internet. This enrollment provides an independent verifier (the secure management server) of user identity, which provides security for pairing operations. More specifically, the secure management server, having verified the identity of a particular user via the enrollment credentials, orchestrates an out-of-band pairing operation between an enrolled device and another device, to pair these two devices, which improves security as compared with in-band pairing. Once enrollment and pairing are completed, communications can proceed between the devices over the local wireless network. For additional security, the enrollment may include biometric data based authentication in addition to other forms of authentication.

Speed of pairing is also improved by the authentication system. Specifically, because the secure management server verifies the identity of a device when that device becomes enrolled with the secure management server, and because enrollment can generally occur at any time, pairing between the enrolled device and another device can occur prior to communications between the devices across the local wireless network begin. Thus, when the devices first encounter each other, they may already be paired, meaning that the delay that would occur upon those two devices encountering each other is reduced or eliminated. This "pre-pairing" effectively improves the speed with which devices can begin communicating over the local wireless network.

Further, because pairing occurs out-of-band, eavesdropping and security attacks are generally less effective. More specifically, the pairing occurs "out-of-band," via the infrastructure network, which reduces the effectiveness of wireless eavesdropping operations occurring in the vicinity of the two devices communicating via the local wireless network.

The term "local wireless network" is used to denote a network that facilitates wireless communication that can occur independently of a separate infrastructure of a network. One example of a local wireless network is a network based on the BLUETOOTH wireless technology standard, which was initially developed by Ericsson and is managed by the BLUETOOTH Special Interest Group. The disclosure provided below generally makes reference to BLUETOOTH technology as an example of a short range wireless computer network. However, it should be understood that the teachings of this disclosure are not so limited and that other short range wireless technologies are possible. Thus, the term "BLUETOOTH," when used below, may be substituted by other short range wireless technologies.

Figure 1A:
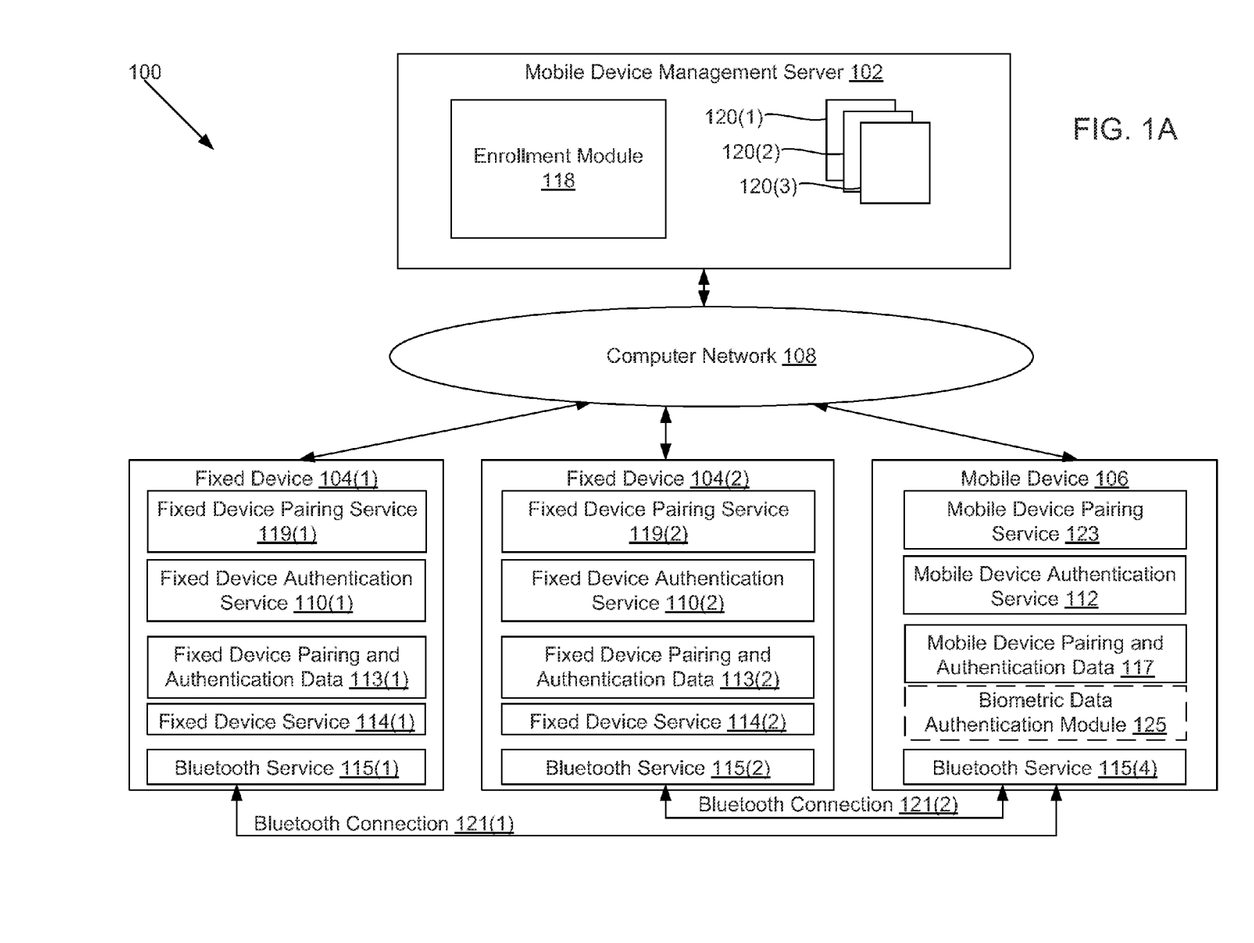
FIG. 1A is a block diagram of an authentication system for authenticating a mobile device to one or more fixed devices in a secure manner.

FIG. 1A is a block diagram of an authentication system 100 for authenticating mobile device 106 to one or more fixed devices 104 in a secure manner, according to an embodiment. As shown, authentication system 100 includes a mobile device management server 102, fixed devices 104, mobile device 106, and computer network 108 (also referred to herein as an "infrastructure network").

Mobile device management ("MDM") server 102 facilitates pairing between fixed devices 104 and mobile devices 106 in an out-of-band manner via computer network 108. Enrollment module 118 performs enrollment techniques, based on authentication profiles 120. In general, MDM server 102 may be part of a single or distributed computer system that manages authorization by users to various devices "managed" by MDM server 102. Such a system may be the "AirWatch®" computing system, available from VMware, Inc. of Palo Alto, Calif. In general, this system remotely manages various aspects of computing devices that are associated with the system. This system may, for example, receive requests to perform various actions by applications executing on, or by users of electronic devices, verify permission for such actions, and allow or disallow the actions. The system may allow an administrator to designate such permissions. The system may also manage data on the various devices by writing data to, or deleting data from such devices. The data may include configuration data, instructions, or other types of data. Other functions for the system are possible.

Fixed devices 104 generally include computing devices that execute a fixed device authentication service 110, a fixed device pairing service 119, and provide fixed device services 114. Typically, fixed devices 104 are "fixed" in the sense that these devices are typically permanently or semi-permanently coupled to a power supply (e.g., "plugged-in" to a "wall socket"), and occupy a more or less permanent physical location, although these two characteristics are not strictly required. Examples of fixed devices 104 include information kiosks, desktop computers, "smart" door lock mechanisms, and various other types of computing devices. Fixed devices 104 may be considered public or private. Public fixed devices 104 are devices whose services (fixed device services 114) may be used by multiple users and are devices that are generally not considered to be associated with a single user (or small group of users). Private fixed devices 104, on the other hand, are devices whose services are used by a set of specifically specified users.

Mobile devices 106 generally include computing devices that execute a mobile device authentication service 112 and a mobile device pairing service 123. Typically, mobile devices 106 are "mobile" in the sense that these devices are not permanently coupled to a power supply and may be moved around. Examples of mobile devices 106 include various mobile computing devices such as mobile phones, tablets, laptops, and other mobile computing devices. Although only one mobile device 106 is illustrated in FIG. 1, authentication system 100 may include multiple mobile devices 106.

Several fixed devices 104 are illustrated. As described above, the fixed devices can be either public or private. In one example, fixed device 104(1) is private and fixed device 104(2) is public.

In both fixed device 104 and mobile device 106, fixed device pairing service 119 and mobile device pairing service 123 cooperate to manage out-of-band BLUETOOTH pairing via MDM server 102. BLUETOOTH service 115 incorporates both the BLUETOOTH "stack" (the set of software that manages BLUETOOTH functionality for fixed device 104) and also the hardware that provides BLUETOOTH communication.

Computer network 108 communicatively couples MDM server 102 to fixed devices 104 and mobile device 106 for enrollment and BLUETOOTH pairing purposes. Computer network 108 is any type of network that allows communication between MDM server 102, fixed devices 104, and mobile devices 106. In various examples, computer network 108 comprises and/or may include any of the following: an Ethernet network, a wireless or wired local area network, a global computer network such as the Internet, or other networks for forming communications between computing devices.

Mobile devices 106 are generally associated with a particular using entity, such as a human owner of the mobile device 106, a group of owners, an organization, or other entities. That particular using entity has a set of enrollment credentials, which, when provided to enrollment module 118 (included within mobile device management server 102 ("MDM server")), along with an identification of a particular mobile device 106, enroll that mobile device 106 with MDM server 102 as belonging to the using entity associated with the enrollment credentials. This enrollment permits out-of-band BLUETOOTH pairing via computer network 108 so that mobile device 106 may subsequently authenticate to an appropriate fixed device 104 via a BLUETOOTH connection 121 and be allowed to access fixed device services 114. In general, enrollment is governed by authorization profiles 120, which describe which using entities (identified via enrollment credentials) are able to pair with which fixed devices 104. The authentication profiles 120 may be generated by an administrator or similar entity.

Enrollment permits pairing to occur between fixed device 104 and mobile device 106. Pairing generally comprises an exchange of security objects so that subsequent secure communications may occur. This pairing occurs in an out-of-band manner, via computer network 108, with the assistance of MDM server 102 (as opposed to in-band, via BLUETOOTH connection 121). This out-of-band pairing allows the security objects to be exchanged early—that is, before fixed device 104 communicates with mobile device 106 via BLUETOOTH connection—and securely.

Once pairing occurs, authentication between a fixed device 104 and a mobile device 106 may occur. Authentication allows mobile device 106 to cooperate with fixed device 104 to execute fixed device service 114 service 115 via BLUETOOTH connection 121. Fixed device pairing and authentication data 113 and mobile device pairing and authentication data 117 store data for these pairing and authentication techniques. Fixed device authentication service 110 and mobile device authentication service 112 cooperate to authenticate communications via BLUETOOTH connection 121. Authentication techniques generally involve mobile device authentication service 112 of mobile device 106 and fixed device authentication service 110 of a particular fixed device 104 cooperating to authenticate a user associated with the mobile device 106 based on exchanged security objects, which then makes the fixed device service 114 available to that user.

More specifically, fixed device 104 periodically scans for mobile devices 106 (perform a BLUETOOTH discovery scan) and, upon detecting a mobile device 106 enrolled in MDM server 102 and authorized to connect to fixed device 104, begins an authorization process. Mobile device 106 may periodically perform a BLUETOOTH Inquiry scan followed by a Page scan. Inquiry scans help with listening to discovery scans. Page scans help listen to authentication requests. To save power, mobile device 106 may perform these scans only when mobile device 106 is moving, which can be determined based on a global positioning system (GPS) scan or on other factors.

Fixed device service 114 generally constitutes services that may be made available to a user after authentication has taken place. Fixed device service 114 may include one or more of many different kinds of services, such as device tracking services, data transmission services, device login or unlocking services (i.e., a service for verifying that a user is permitted to access a particular service, such as with the situation where a desktop logs in a user associated with a mobile device 106 and thus unlocks computing functionality for that user), and a broad array of other services. In one example, a fixed device 104 is a "smart" door lock and a mobile device 106 is a cellular phone. The cellular phone and door lock communicate to authenticate and verify the identity of the user that is the owner of the cellular phone. Upon authenticating in this manner, the door lock opens to allow the user to open the door. In another example, a fixed device 104 is a desktop computer and a mobile device 106 is a cellular phone. The cellular phone and desktop computer cooperate to authenticate and verify the identity of the user that is the owner of the cellular phone. Upon authenticating in this manner, the desktop computer logs the user on, thus allowing the user access to the desktop computer. Yet another example includes a fixed device 104 that is a presentation sharing system and a mobile device 106 that is a mobile phone, where authenticating allows the mobile phone to provide audio and/or video data to the presentation sharing system so that a user may broadcast a question, a video clip, a screen capture, or other data, to a room. Still another example includes a fixed device 104 that is a desktop sharing system within a presentation room and a mobile device 106 that is a laptop computer. Upon authenticating, the desktop sharing system presents a shared desktop for display on the laptop computer. In each of these instances, the service provided by the fixed device 104 corresponds to the fixed device service 114 described above.

Figure 1B:
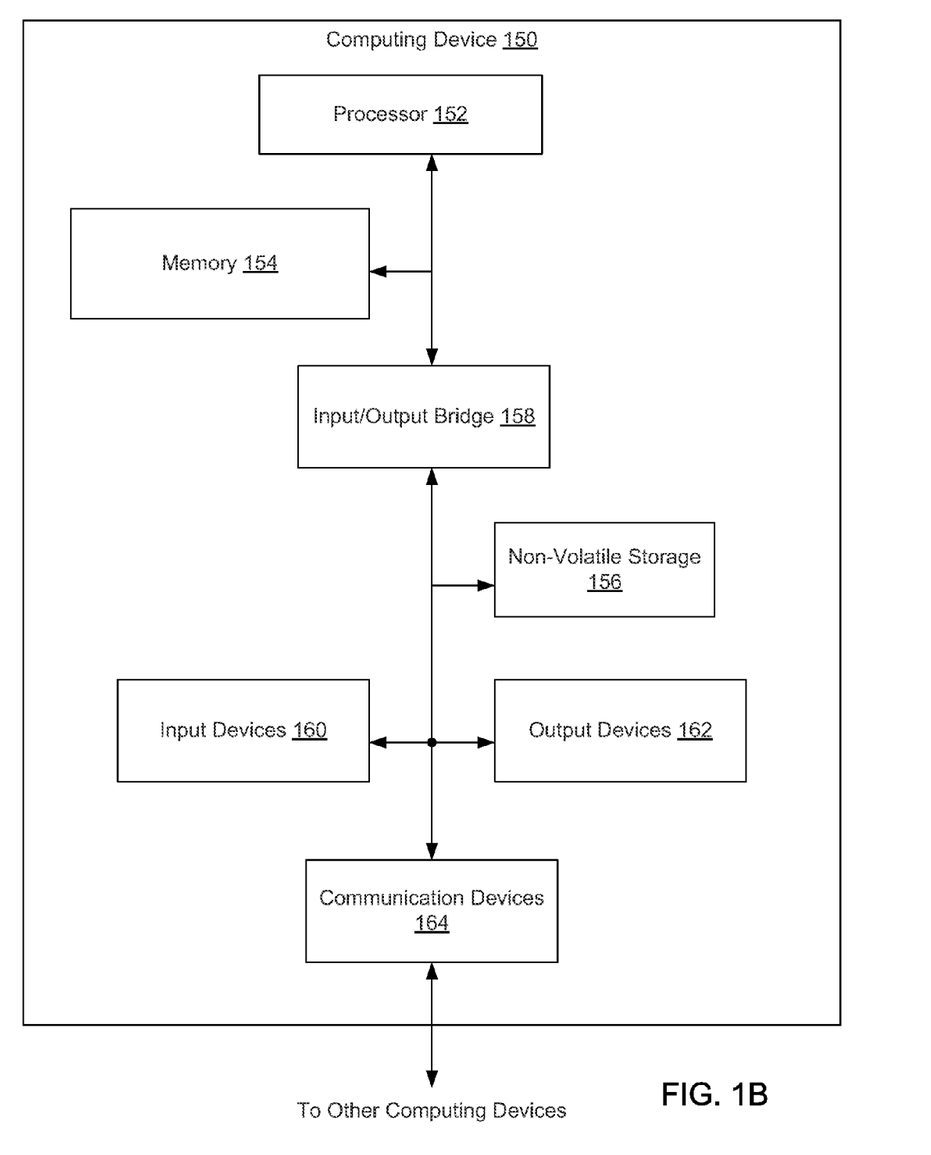
FIG. 1B is a block diagram of a computing device that may implement aspects of one or more of fixed devices, mobile devices, and an MDM server of the authentication system of FIG. 1A, according to an embodiment.

FIG. 1B is a block diagram of a computing device 150 that may implement aspects of one or more of fixed devices 104, mobile devices 106, and MDM server 102, according to an embodiment. Computing device 150 includes processor 152, memory 154, non-volatile storage 156, input/output bridge 158, input devices 160, output devices 162, and communication devices 164. Processor 152, as is known, receives instructions and data and executes instructions to manipulate data as specified. Processor 152 may include one or more processors of a wide variety of processor types. Memory 154 stores instructions and data for manipulation by processor 152. Input/output bridge 158 allows processor 152 and memory 154 to communicate with other devices. Non-volatile storage 156 stores data and instructions in a non-volatile manner for recall by processor 152 and memory 154 on demand. Input devices 160 include devices that allow a user or other entity to input data into computing device 150. Input devices 160 may include devices such as keyboards, mice, and the like. Output devices 162 include devices that provide output information to a user or other entity and may include devices such as monitors, printers, and the like. Communication devices 164 include devices that facilitate communication by computing device 150 with other external computing devices. Communication devices 164 thus may include devices such as Ethernet devices, wireless communication devices, BLUETOOTH devices, and the like.

Any of fixed device 104, mobile device 106, and MDM server 102 may include one or more instances of computing device 150. Further, the different instances of computing device 150 included in fixed device 104, mobile device 106, or MDM server 102 may vary in terms of specific implementation. For example, MDM server 102 may include a large number of computing devices 150 and/or computing devices 150 that include a large number of processors 152, in order to handle large processing loads. By contrast, mobile device 106 may include a smaller number of processors 150 in order to conserve electrical power. Additionally, communication devices 164 of fixed devices 104 and mobile devices 106 include a BLUETOOTH module to perform BLUETOOTH communications. However, MDM server 102 may not have such a BLUETOOTH module. Other variations within the abilities of those of ordinary skill in the art are possible.

Figure 2:
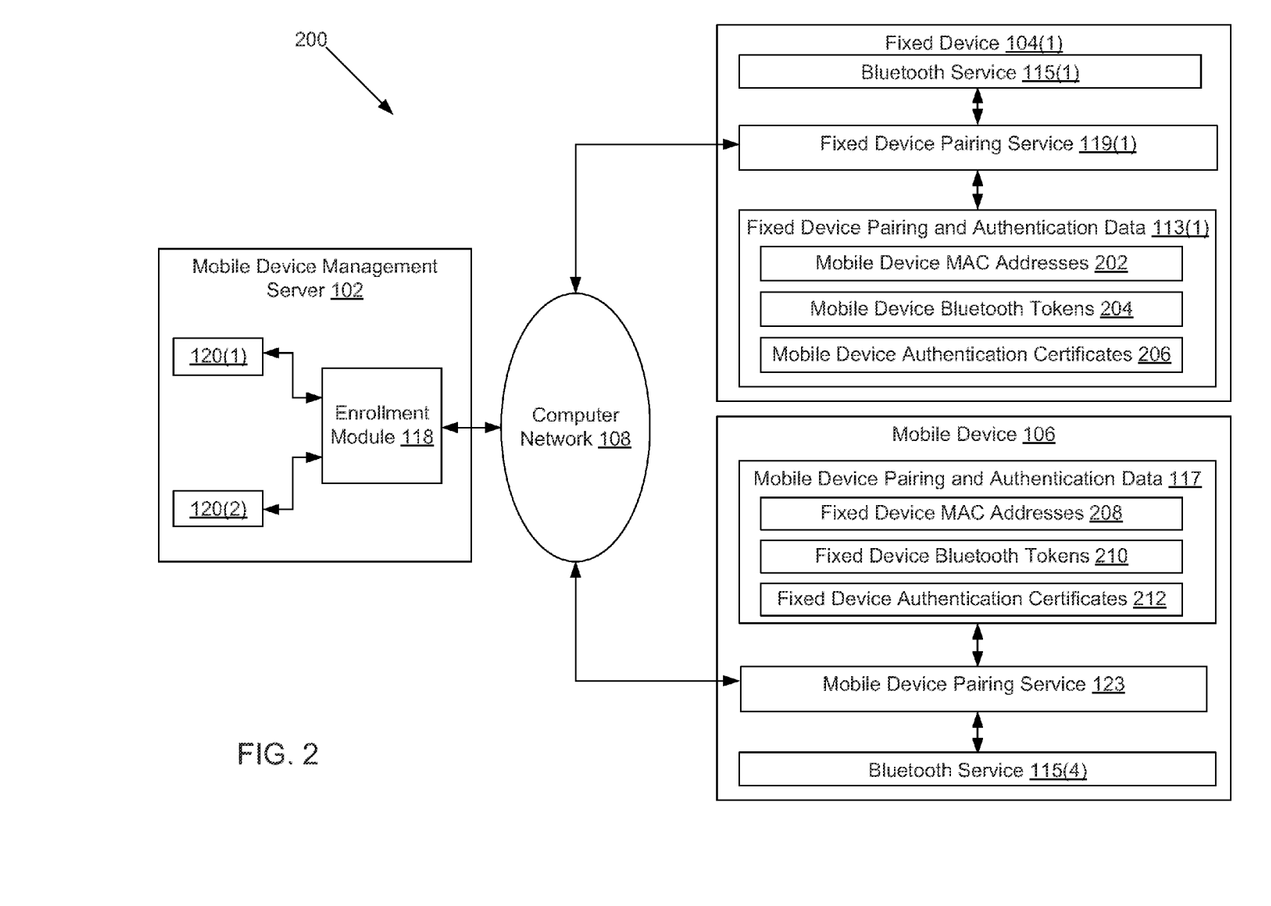
FIG. 2 is a block diagram illustrating an enrollment sub-configuration of authentication system of FIG. 1, according to an embodiment.

FIG. 2 is a block diagram illustrating an enrollment sub-configuration 200 of authentication system 100 of FIG. 1, according to an embodiment. As shown, the enrollment sub-configuration 200 includes the modules of fixed device 104 and mobile device 106 involved with out-of-band pairing, which constitute a subset of the modules illustrated in FIG. 1.

As described above, a user may enroll a particular mobile device 106 with the MDM server 102. To enroll a mobile device 106, the user provides user credentials (also referred to herein as "enrollment credentials" to MDM server 102. The user credentials may be provided via mobile device 106 or may be provided independently of mobile device 106, along with an identification of mobile device so that MDM server 102 may associated the user credentials with mobile device 106.

Upon verifying the user credentials, MDM server 102 examines authentication profiles 120 to determine which fixed devices 104 the mobile device 106 is permitted to pair with. For each private fixed device 104 that mobile device 106 is permitted to pair with based on the authentication profiles 120, enrollment module 118 causes a pairing to occur between the private fixed device 104 and the mobile device 106. Enrollment module 118 also records, in an authentication profile 120, this pairing. For each public fixed device 104 that mobile device 106 is permitted to pair with based on the authentication profiles 120, enrollment module 118 does not perform pairing operations upon enrollment by the user. Instead, for public fixed devices 104, pairing occurs when the public fixed device 104 detects, via a BLUETOOTH connection 121, the presence of a mobile device in the vicinity of the public fixed device.

The pairing that is performed is conducted between mobile device pairing service 123 and fixed device pairing service 119, via computer network 108, with MDM server 102 as an intermediary. Pairing (also referred to herein as "BLUETOOTH pairing") refers to the exchange of security tokens between two BLUETOOTH enabled devices. The pairing performed between fixed device 104 and mobile device 106 is referred to as an out-of-band pairing because the pairing is done over a channel that is not a BLUETOOTH connection 121. The out-of-band channel over which pairing is performed herein is the computer network 108, which, as described above, may be any type of computer network, including a global communications network such as the Internet or a local area network (LAN).

To pair the devices, fixed device pairing service 119(1) requests from BLUETOOTH service 115(1) one or more BLUETOOTH security tokens to be used for a first level authentication token. BLUETOOTH service 115(1) generates the one or more BLUETOOTH security tokens and transmits them to fixed device pairing service 119(1). Fixed device pairing service 119(1) transmits the generated BLUETOOTH security tokens, and the media access control address ("MAC address") associated with BLUETOOTH service 115(1) of fixed device 104(1) to the MDM server 102 via computer network 108. Mobile device 106 also obtains BLUETOOTH security tokens from BLUETOOTH service 115(4), and transmits the BLUETOOTH security tokens and the MAC address associated with the BLUETOOTH service 115(4) to the MDM server 102 via computer network 108. MDM server 102 transmits MAC address of the mobile device and the BLUETOOTH security tokens generated by the BLUETOOTH service 115(4) of the mobile device 106 to the fixed device 104(1), which stores this information in fixed device authentication data 113(1). Similarly, MDM server 102 transmits the MAC address 208 of the fixed device 104 and the BLUETOOTH security tokens generated by the BLUETOOTH service 115(1) of the fixed device 104(1) to the mobile device 106, which stores this information in mobile device authentication data 117.

Other mobile devices 106 may also belong to the user that enrolled the mobile device 106 that is paired. Thus, MDM server 102 synchronizes the mobile device authentication data 117 across other mobile devices 106 that belong to that user. More specifically, upon pairing, MDM server 102 transmits the fixed device BLUETOOTH security token and fixed device security certificate to all mobile devices 106 associated with the enrollment credentials for that the user, so that the user may use any of those mobile devices 106 to access fixed device services 114.

To provide a second level of authentication, MDM server 102 also generates certificates for authentication, in addition to the BLUETOOTH security tokens generated by the respective BLUETOOTH services 115. These certificates may be any type of well-known security certificate that allows each of two different computing devices to verify the identity of the other. MDM server 102 then transmits one security certificate to the mobile device 106 and another security certificate to the fixed device 104.

The fixed device authentication data 113(1) for the fixed device 104(1) thus includes mobile device MAC addresses 202, mobile device BLUETOOTH tokens 204 (also referred to herein as a "security token"), and mobile device authentication certificates 206 for mobile devices 106 that are paired with the fixed device 104(1). Similarly, the mobile device authentication data 117 includes fixed device MAC addresses 208, fixed device BLUETOOTH tokens 210, and fixed device authentication certificates 212 for fixed devices 104 paired with the mobile device 106.

Pairing operations occur between fixed devices 104 that are considered private and mobile devices 106 when the mobile device 106 enrolls with MDM server 102. However pairing operations do not occur between mobile devices 106 and public fixed devices 104 upon enrollment with the MDM server 102. Instead, pairing between mobile devices 106 and public fixed devices 104 occurs when the mobile devices 106 is brought in range of a particular public fixed device 104. More specifically, public fixed devices 104 periodically perform a BLUETOOTH discovery scan to discover and identify mobile devices 106. Upon discovering a mobile device 106, public fixed device 104 obtains the BLUETOOTH MAC address of the discovered mobile device 106 and sends that MAC address to MDM server 102. At that point, MDM server 102 performs pairing operations, obtaining the BLUETOOTH tokens and security certificates, and transmitting those items to the mobile device 106 and fixed device 104.

Optionally, as part of the enrollment process, mobile device 106 may enroll with MDM server 102 as being associated with biometric data for a particular user. In various embodiments, biometric data may include fingerprint data, retinal scan data, or other types of biometric data. At the time of the enrollment process, a user may choose to utilize biometric data to increase the security of the BLUETOOTH authentication process. The user would indicate this choice to mobile device 106, which would then indicate this choice to MDM server 102. If the user chooses to use biometric data, then MDM server 102 would note this choice and, when a user wishes to authenticate in order to gain access to fixed device services 114, would require that the user authenticate via biometric data. Using biometric data would prevent an unauthorized person from utilizing the mobile device 106 to authenticate as the user in order to gain access to services in an unauthorized manner.

Mobile device 106 may include a biometric data verification module 125. To "set up" or "initialize" use of biometric data for authentication in mobile device 106, biometric data verification module 125 is configured to obtain an initial set of biometric data that serves as a reference for future biometric data-based authentication. This would be obtained prior to the enrollment procedure. For example, biometric data verification module 125 may display a prompt to a user that requests that the user provide biometric data (such as a fingerprint). Biometric data verification module 125 records the biometric data provided by the user as the initial set of biometric data. Biometric data verification module 125 is configured to subsequently verify the identity of a user based on the biometric data upon request. More specifically, biometric data verification module 125 may receive a request to verify the identity of a user based on biometric data. In response to this request, biometric data verification module 125 prompts a user to enter biometric data and compares that entered biometric data against the stored initial set of biometric data. If the entered biometric data matches the stored biometric data, then biometric data verification module 125 deems the biometric data verification to succeed. If the entered biometric data does not match the stored biometric data, then biometric data verification module 125 deems the biometric data verification to not succeed.

To enroll a user as being associated with biometric data, during the enrollment process, MDM server 102 requests mobile device 106 to verify the identity of a user via biometric data. If this verification succeeds, mobile device 106 transmits a notification of this success to MDM server 102, which, in response, notes that the user is enrolled as being associated with biometric data. The fact that a particular user is enrolled as being associated with biometric data affects the manner in which BLUETOOTH authentication occurs, including what security certificates are generated, when they are generated, and when they are transmitted to mobile device 106 and fixed device 104.

There are several options for handling security certificates when biometric data-based verification is enabled. According to one option, MDM server 102 generates a security certificate at enrollment time that is specifically associated with the biometric data for additional authentication between fixed device 104 and mobile device 106 (in addition to the security certificate described above). This biometric data-associated security certificate would be used as an authentication mechanism that is in addition to those described above. More specifically, mobile device 106 and fixed device 104 would need to use that security certificate to perform authentication, in addition to the other security certificate and BLUETOOTH token. According to another option, MDM server 102 does not generate such a biometric data-associated security certificate at enrollment time, but instead generates such a certificate when mobile device 106 comes into proximity with MDM server 102 and upon receiving an indication from a mobile device 106 that a user has passed a biometric data verification. According to a further option, MDM server 102 does not generate such a certificate at all. Instead, biometric data verification is used as an additional "hurdle" that must be cleared before releasing the security certificate described above. More specifically, in one embodiment, authentication via BLUETOOTH simply does not occur until after a user passes a biometric data verification, which would cause the associated mobile device 106 to notify MDM server 102 that biometric data based verification succeeds. In another embodiment, part of the authentication via BLUETOOTH may occur even without biometric data verification succeeding, but MDM server 102 does not download the certificates that are associated with BLUETOOTH authentication, described above, to mobile device 106 and fixed device 104 until receiving an indication from mobile device 106 that biometric data based authentication succeeded.

Figure 3:
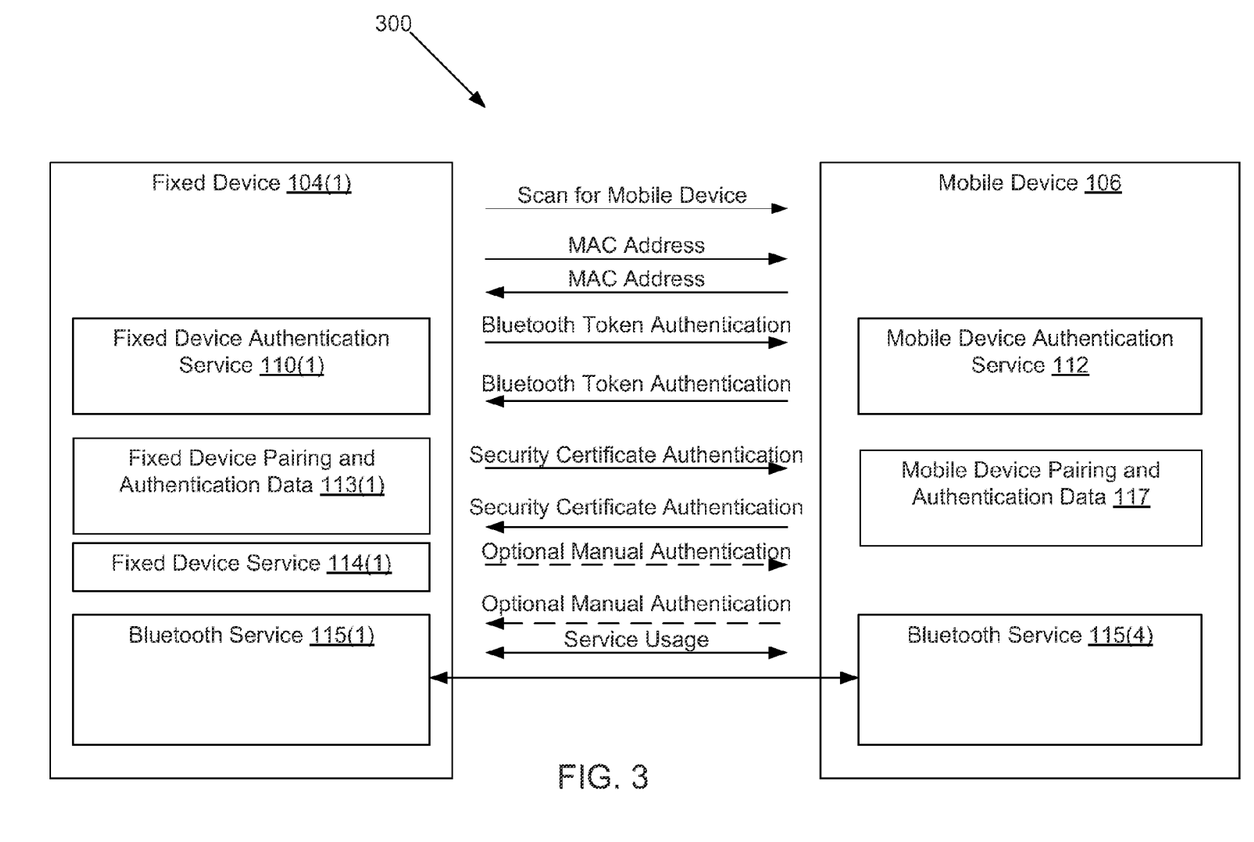
FIG. 3 is a block diagram illustrating an authentication sub-configuration of authentication system of FIG. 1, including a private fixed device and a mobile device, according to an embodiment.

FIG. 3 is a block diagram illustrating an authentication sub-configuration 300 of authentication system 100 of FIG. 1, including a private fixed device 104(1) and a mobile device 106, according to an embodiment. Private fixed device 104 and mobile device 106 establish a secure connection and cooperate to execute a service (fixed device service 114).

Because the fixed device 104(1) is private, private fixed device 104(1) and mobile device 106 completed out-of-band pairing via the MDM server 102 upon enrollment by the mobile device 106, which is completed as described above. Thus, both private fixed device 104(1) and mobile device 106 already have the BLUETOOTH tokens and security certificates that are generated as a part of this out-of-band pairing process.

To initiate communication with mobile device 106, private fixed device 104 periodically scans for mobile devices 106. Upon detecting a mobile device 106, private fixed device 104(1) obtains the MAC address of the mobile device 106 and determines if the MAC address is one of the MAC addresses stored in mobile device MAC addresses 202 stored in fixed device pairing and authentication data 113 (FIG. 2). Private fixed device 104(1) also sends the MAC address of private fixed device 104(1) to mobile device 106 so that mobile device 106 may verify the identity of private fixed device 104(1) based on mobile device pairing and authentication data 117.

After verifying the respective MAC addresses, private fixed device 104(1) and mobile device 106 perform BLUETOOTH authentication. BLUETOOTH authentication is performed based on the BLUETOOTH tokens exchanged via MDM server 102 during enrollment. This BLUETOOTH authentication is generally a challenge-response operation, in which one device (either private fixed device 104(1) or the mobile device 106) creates a "challenge" based on a BLUETOOTH security token and the other device answers that challenge based on a BLUETOOTH security token. The two BLUETOOTH security tokens involved in this challenge-response operation are the two paired tokens generated by the BLUETOOTH services 115 in the pairing operation. Because the private fixed device 104(1) and the mobile device 106 have already been paired via MDM server 102, these devices have the appropriate BLUETOOTH tokens and thus successfully complete the BLUETOOTH authentication process.

After the BLUETOOTH authentication process, private fixed device 104(1) and mobile device 106 perform authentication with security certificates. As with BLUETOOTH authentication, security certificate authentication proceeds successfully since the associated security certificates are exchanged during the out-of-band pairing via MDM server 102. After security certificate authentication, optionally, private fixed device 104(1) and mobile device 106 perform a manual authentication. Manual authentication generally consists of the mobile device 106 providing some additional security object such as a password, a number, a fingerprint, or other security token. In response, private fixed device 104(1) verifies the provided security object and authenticates mobile device 106. Once the BLUETOOTH authentication, security certificate authentication, and, if used, the manual authentication, have been successfully verified, private fixed device 104(1) communicates with mobile device 106 to provide one or more BLUETOOTH services 115.

If MDM server 102 stores an indication that mobile device 106 is associated with biometric data (and thus that MDM server 102 should request that user identification be verified via biometric data), then MDM server 102 performs steps in addition to those described above. In one embodiment, MDM server 102 transmits the security certificates between mobile device 106 and private fixed device 104(1) only upon determining that a biometric data verification procedure succeeds. In another embodiment, MDM server 102 transmits security certificates specifically associated with biometric data to the mobile device 106 and private fixed device 104(1) only upon determining that a biometric data verification procedure succeeds. Such security certificates may be generated upon enrollment or upon determining that the biometric data verification procedure succeeds. If the security certificates are generated upon determining that the biometric data verification procedure succeeds, then those security certificates may have an associated limited lifetime, after which the security certificates become invalid. Either or both of mobile device 106 and private fixed device 104(1) may delete a security certificate upon becoming invalid. Additionally, if the security certificates that are specifically associated with biometric data are used, communications between mobile device 106 and private fixed device 104(1) would proceed only if authentication via the biometric security certificates succeeds, in addition to the other authentication steps described above.

To determine whether a biometric data verification procedure succeeds, MDM server 102 requests that mobile device 106 perform biometric data verification. In response, mobile device 106 prompts a user to provide biometric data and verifies that biometric against stored biometric data. If mobile device 106 determines that the biometric data matches the stored biometric data, then mobile device 106 transmits a signal to MDM server 102 that the biometric data verification succeeds. If mobile device 106 determines that the biometric data does not match the stored biometric data, then mobile device 106 transmits a signal to MDM server 102 that the biometric data verification does not succeed.

With the biometric techniques described above, an imposter is prevented from simply obtaining an enrolled mobile device 106 and authenticating with a particular fixed device 104. The biometric data thus acts as an additional security mechanism.

Figure 4:
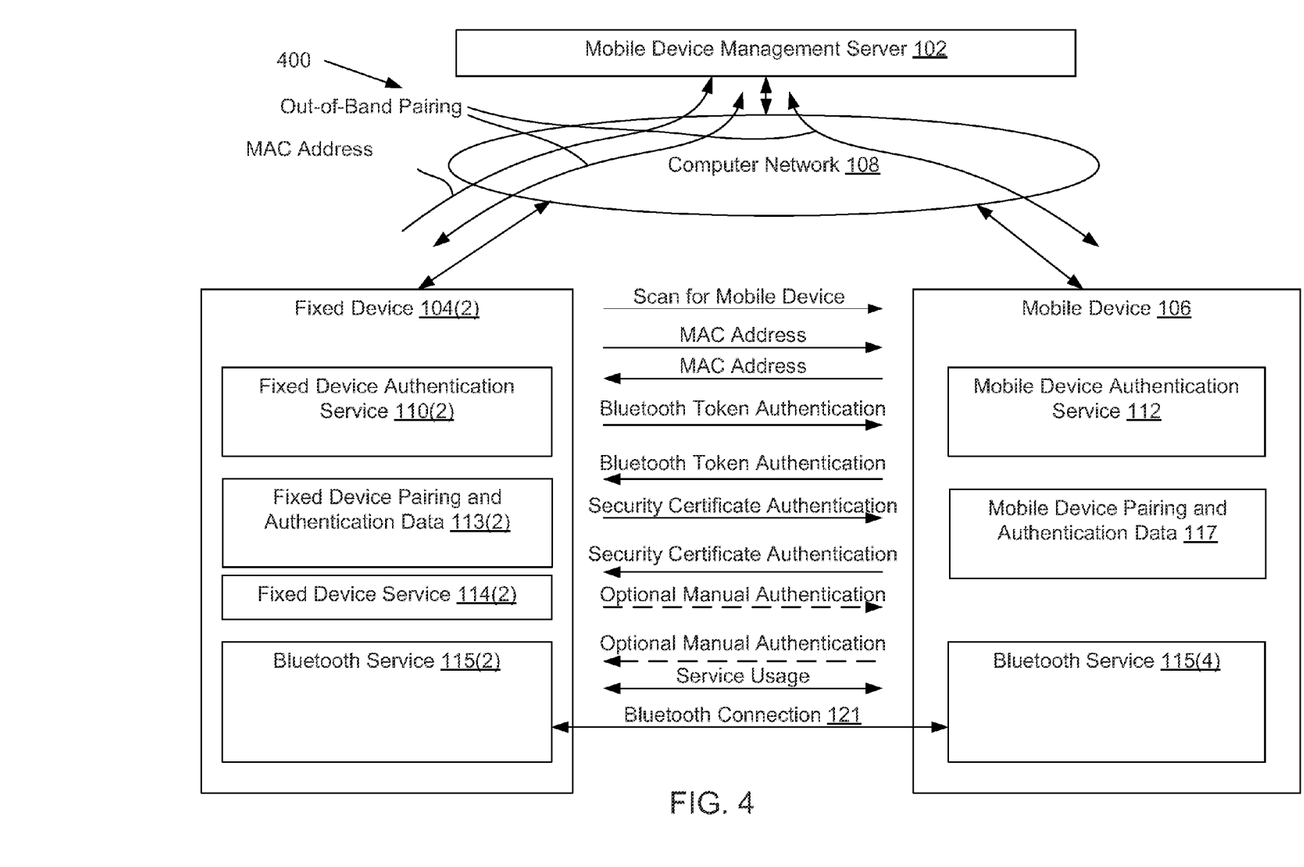
FIG. 4 is a block diagram illustrating an authentication sub-configuration of authentication system of FIG. 1, including a public fixed device and a mobile device, according to an embodiment.

FIG. 4 is a block diagram illustrating an authentication sub-configuration 400 of authentication system 100 of FIG. 1, including a public fixed device 104(2) and a mobile device 106, according to an embodiment. As with the authentication sub-configuration 300 of FIG. 3, public fixed device 104(2) and mobile device 106 establish a secure connection and cooperate to execute a service—fixed device service 114(2).

Because fixed device 104(2) is public, as opposed to private, public fixed device 104(2) does not pair with mobile device 106 when mobile device 106 enrolls with enrollment module 118. Instead, public fixed device 104(2) performs out-of-band pairing with mobile device 106 upon scanning for and detecting mobile device 106 via a BLUETOOTH discovery scan. More specifically, public fixed device 104(2) periodically scans for mobile device 106 (that is, for any mobile device 106). Upon detecting a mobile device 106, public fixed device 104(2) obtains the MAC address from mobile device 106 and transmits the MAC address of mobile device 106 to MDM server 102 via computing network 108. MDM server 102 checks authentication profiles 120 to determine whether the MAC address is associated with an enrolled mobile device 106. The operation of transmitting the MAC address of the mobile device 106 to the MDM server 102 may be referred to herein as an identification inquiry. If the MAC address is associated with an enrolled mobile device 106, then MDM server 102 initiates out-of-band pairing between public fixed device 104(2) and mobile device 106. More specifically, MDM server 102 transmits BLUETOOTH tokens and security certificates from mobile device 106 to public fixed device 104(2) and transmits BLUETOOTH tokens and security certificates from public fixed device 104(2) to mobile device 106. These BLUETOOTH tokens and security certificates are sent via computer network 108.

Once the respective BLUETOOTH tokens and security certificates are sent to public fixed device 104(2) and mobile device 106, these devices are paired. At this point, public fixed device 104(2) and mobile device 106 perform authentication via BLUETOOTH connection 121. This authentication is similar to the authentication described with respect to FIG. 3. More specifically, mobile device 106 and public fixed device 104(2) perform authentication with BLUETOOTH tokens, including the BLUETOOTH challenge-response operation described above. Mobile device 106 and public fixed device 104(2) also perform authentication with the security certificates as described above. Additionally, mobile device 106 and public fixed device 104(2) perform manual authentication if that authentication mechanism is desired. Once BLUETOOTH token based authentication, security certificate authentication, and manual authentication, if used, are successful, mobile device 106 and public fixed device 104(2) cooperate to execute BLUETOOTH service 115(2).

Authentication profiles 120 may indicate that a particular user is only temporarily authorized to pair with a particular fixed device 104. In such a situation, after the temporary authorization expires, MDM server 102 deletes the BLUETOOTH tokens and security certificates from paired fixed devices 104 and from the user's mobile devices 106, and also no longer allows pairing or authentication between the user's mobile devices 106 and fixed devices 104.

If MDM server 102 stores an indication that mobile device 106 is associated with biometric data, then MDM server 102 performs steps in addition to those described above. In one embodiment, MDM server 102 transmits the security certificates between mobile device 106 and public fixed device 104(2) only upon determining that a biometric data verification procedure succeeds. In another embodiment, MDM server 102 transmits security certificates specifically associated with biometric data to the mobile device 106 and public fixed device 104(2) only upon determining that a biometric data verification procedure succeeds. Such security certificates may be generated upon enrollment or upon determining that the biometric data verification procedure succeeds. If the security certificates are generated upon determining that the biometric data verification procedure succeeds, then those security certificates may have an associated limited lifetime, after which the security certificates become invalid. Either or both of mobile device 106 and public fixed device 104(2) may delete a security certificate upon becoming invalid. Additionally, if the security certificates that are specifically associated with biometric data are used, communications between mobile device 106 and private fixed device 104(1) would proceed only if authentication via the biometric security certificates succeeds, in addition to the other authentication steps described above.

To determine whether a biometric data verification procedure succeeds, MDM server 102 requests that mobile device 106 perform biometric data verification. In response, mobile device 106 prompts a user to provide biometric data and verifies that biometric data against stored biometric data. If mobile device 106 determines that the biometric data matches the stored biometric data, then mobile device 106 transmits a signal to MDM server 102 that the biometric data verification succeeds. If mobile device 106 determines that the biometric data does not match the stored biometric data, then mobile device 106 transmits a signal to MDM server 102 that the biometric data verification does not succeed.

With the biometric techniques described above, an imposter is prevented from simply obtaining an enrolled mobile device 106 and authenticating with a particular fixed device 104. The biometric data thus acts as an additional security mechanism.

Figure 5:
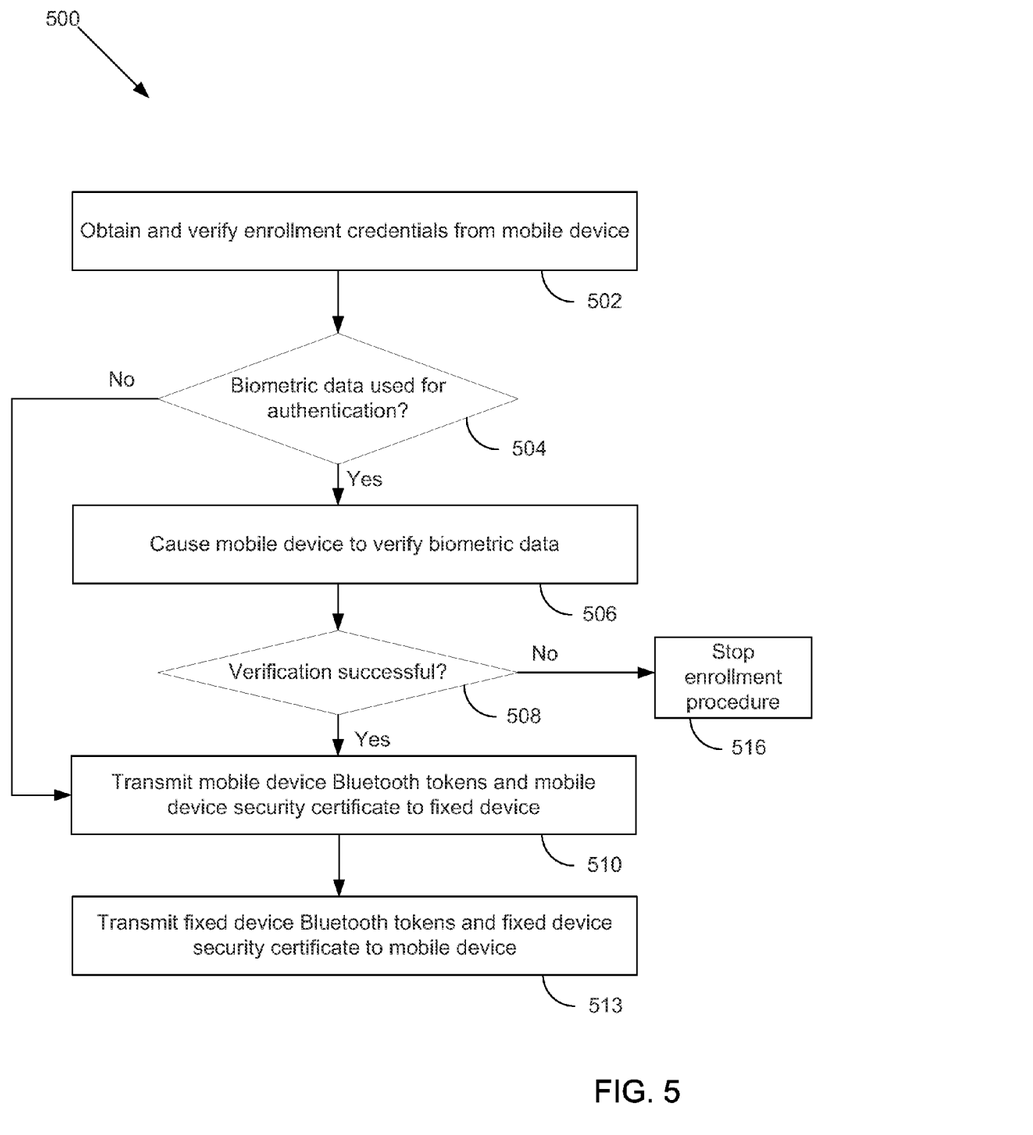
FIG. 5 is a flow diagram of method steps for enrolling a mobile device with MDM server, according to an embodiment.

FIG. 5 is a flow diagram of method steps for enrolling a mobile device 106 with MDM server 102, according to an embodiment. Although the method steps are described in conjunction with FIGS. 1-4, persons skilled in the art will understand that any system configured to perform the method steps, in various alternative orders, falls within the scope of the present invention.

As shown, a method 500 begins at step 502, where enrollment module 118 obtains enrollment credentials from mobile device 106. These enrollment credentials are associated with a particular using entity, such as an individual user, a group of users, an organization, or the like, and serve to verify the identity of the using entity of the mobile device 106 to the MDM server 102. At step 504, enrollment module 118 determines whether biometric data is to be used for authentications that occur. This can be done based on a user input. For example, a user may direct MDM server 102 to use biometric data for future authentication. If biometric data is to be used for authentications that occur, then the method proceeds to step 506. If biometric data is not to be used for authentications that occur, then the method proceeds to step 510.

At step 506, MDM server 102 causes mobile device 106 to verify biometric data for a user. In this situation, mobile device 106 would have previously obtained biometric data ("initial" or "setup" biometric data) in an initialization or setup step. To verify biometric data, mobile device 106 displays a prompt for a user to view. The prompt requests that the user input biometric data. Upon receiving the biometric data, mobile device 106 verifies the newly obtained biometric data against the stored setup biometric data. If the newly obtained biometric data matches the setup biometric data, then the verification succeeds. If the newly obtained biometric data does not match the setup biometric data, then the verification does not succeed. At step 508, MDM server 102 determines if the verification is successful. If the verification is successful, then the method proceeds to step 510. If the verification is not successful, then the method proceeds to step 516, where the enrollment procedure is aborted.

At step 510, MDM server 102 transmits mobile device BLUETOOTH tokens from mobile device 106 and mobile device security certificate to private fixed devices 104 that are associated with the enrollment credentials in authorization profiles 120. BLUETOOTH tokens are generated by BLUETOOTH service 115 of mobile device 106 and security certificates may be generated by MDM server 102. If biometric data is used, MDM server 102 records that biometric data is associated with the mobile device 106 being enrolled. Further, if biometric verification is used and a separate certificate associated with biometric data is created at enrollment (as opposed to at authentication), then MDM server 102 transmits this certificate to the fixed device 104. At step 513, MDM server 102 transmits private fixed device BLUETOOTH tokens and private fixed device security certificate to mobile device 106. If biometric verification is used and a separate certificate associated with biometric data is created at enrollment (as opposed to at authentication), then MDM server 102 transmits this certificate to the mobile device 106. At this point, private fixed device 104 has BLUETOOTH tokens and security certificates for mobile device 106 and mobile device 106 has BLUETOOTH tokens and security certificates for fixed device 104 and thus out-of-band pairing is complete.

Figure 6:
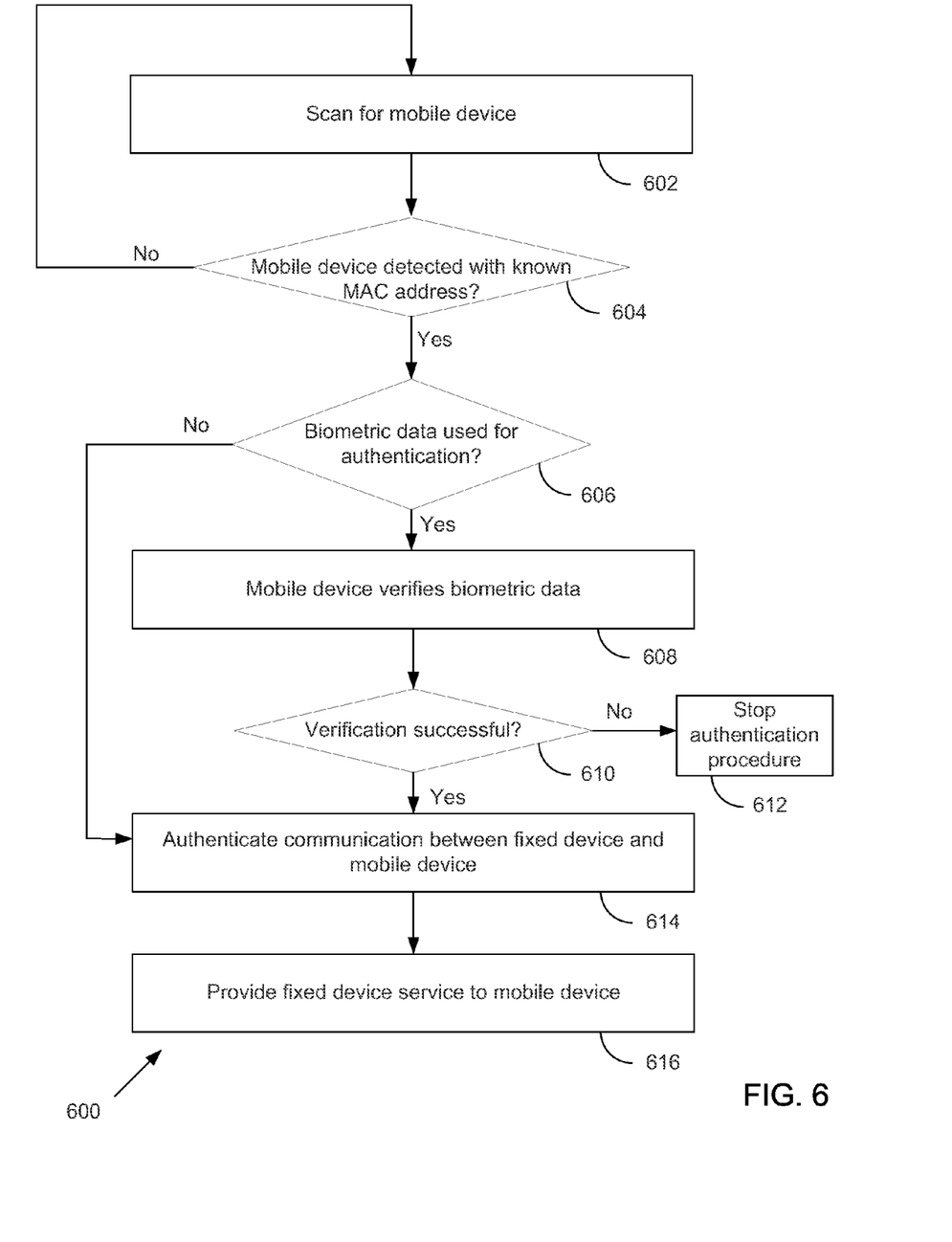
FIG. 6 is a flow diagram of method steps for authenticating communication between mobile device and private fixed device, according to an embodiment.

FIG. 6 is a flow diagram of method steps for authenticating communication between mobile device 106 and private fixed device 104, according to an embodiment. Although the method steps are described in conjunction with FIGS. 1-4, persons skilled in the art will understand that any system configured to perform the method steps, in various alternative orders, falls within the scope of the present invention.

As shown, a method 600 begins at step 602, at which private fixed device 104(1) scans for a mobile device 106. This scanning is performed via BLUETOOTH communications. At step 604, if private fixed device 104 detects a mobile device 106 and that mobile device 106 has a MAC address of a known mobile device 106 (i.e., the MAC address is stored in the fixed device pairing and authentication data 113), then the method proceeds to step 606. If, however, private fixed device 104(1) does not detect a mobile device 106, or detects a mobile device 106 with a MAC address that is not known (i.e., the MAC address is not stored in the fixed device pairing and authentication data 113), then the method returns to step 602.

Because mobile device 106 has a MAC address that is recognized by the private fixed device 104(1), an enrollment operation has already been performed for the mobile device 106. Further, because the fixed device 104 is a private fixed device, the enrollment operation already performed has caused an out-of-band pairing operation to be performed, which means that both the fixed device 104 and mobile device 106 have BLUETOOTH tokens and security certificates for authentication.

At step 606, private fixed device 104(1) determines whether biometric data is used for authentication for mobile device 106. If biometric data is used, then the method 600 proceeds to step 608 and if biometric data is not used, then the method proceeds to step 614. At step 608, mobile device 106 verifies biometric data and at step 610, determines if this verification is successful. If the verification is successful, then the method 600 proceeds to step 614. If the verification is not successful, then method 600 proceeds to step 612, at which the private fixed device 104(1) stops the authentication procedure.

At step 614, private fixed device 104(1) authenticates communication with mobile device 106 over a BLUETOOTH channel 121, which involves performing authentication based on the BLUETOOTH tokens, the security certificate, and optionally, manually. This may also include performing authentication based on security certificates specifically associated with biometric data, if such certificates are used. At step 616, once authenticated, private fixed device 104 provides fixed device service 114 to mobile device 106 upon request.

Figure 7:
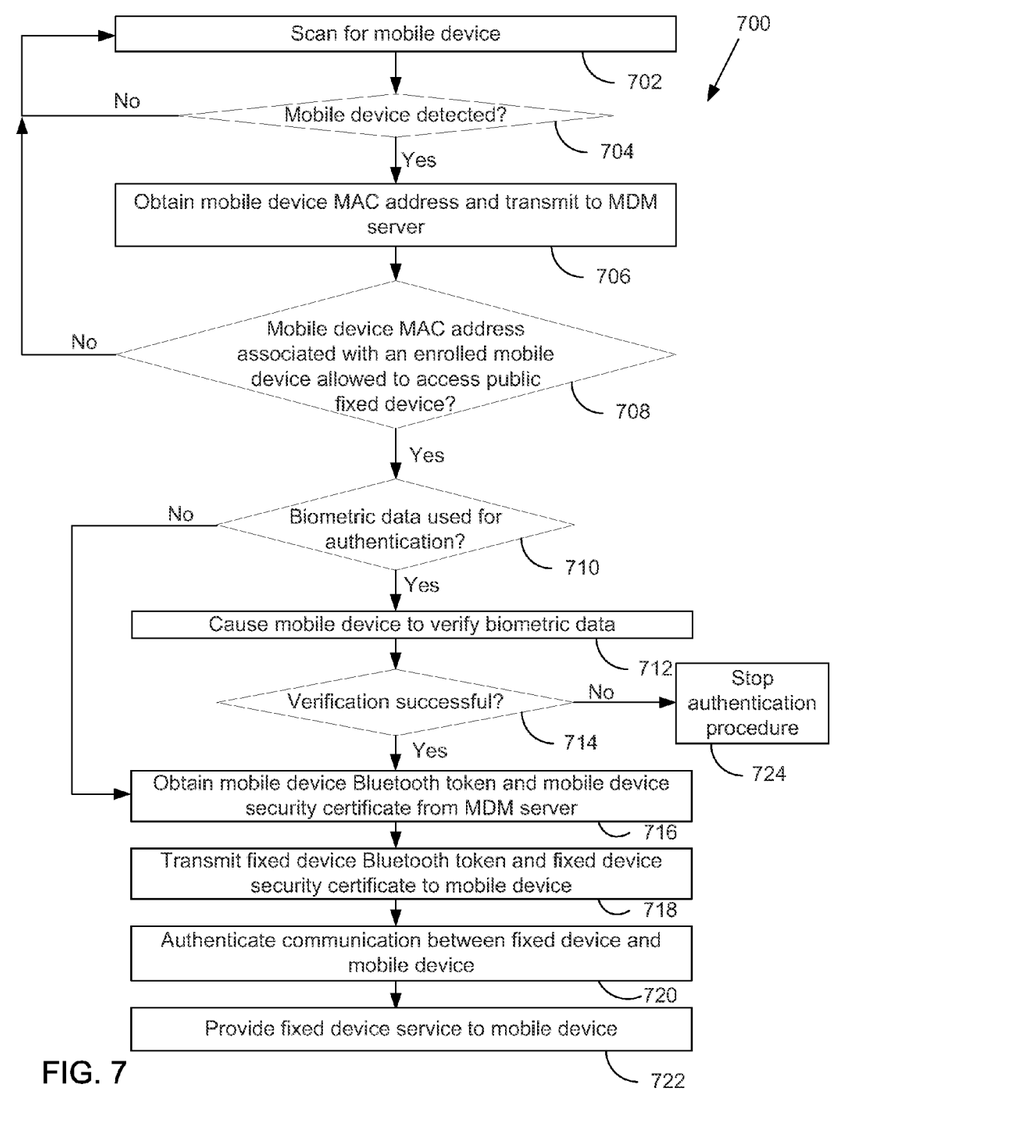
FIG. 7 is a flow diagram of method steps for authenticating communication between mobile device and a public fixed device, according to an embodiment.

FIG. 7 is a flow diagram of method steps for authenticating communication between mobile device 106 and a public fixed device 104, according to an embodiment. Although the method steps are described in conjunction with FIGS. 1-4, persons skilled in the art will understand that any system configured to perform the method steps, in various alternative orders, falls within the scope of the present invention.

As shown, a method 700 begins at step 702, in which public fixed device 104 scans for a mobile device 106. At step 704, if a mobile device 106 is detected, then the method 700 proceeds to step 706. At step 704, if no mobile device 106 is detected, then the method 700 returns to step 702. At step 706, public fixed device 104 obtains the MAC address from the detected mobile device 106 and transmits the MAC address to MDM server 102 to determine whether the mobile device 106 associated with the obtained MAC address is enrolled with the MDM server 102.

At step 708, MDM server 102 determines whether the MAC address of the mobile device 106 received from the public fixed device 104 is associated with an enrolled mobile device 106. If the MAC address is associated with an enrolled mobile device 106, then the method proceeds to step 710. If the MAC address is not associated with an enrolled mobile device 106, then the method returns to step 702.

At step 710, public fixed device 104 determines whether biometric data is used for authentication. If biometric data is used, then method 700 proceeds to step 712 and if biometric data is not used, then method 700 proceeds to step 716. At step 712, public fixed device 104 causes mobile device 106 to verify biometric data. At step 714, the mobile device 106 determines whether the authentication is successful. If the verification is successful, then method 700 proceeds to step 716. If the verification is not successful, then method 700 proceeds to step 724, where public fixed device 104 stops the authentication procedure.

Steps 716 and 718 generally comprise an out-of-band pairing operation. At step 716, public fixed device 104 obtains BLUETOOTH tokens and security certificates (including a biometric data based certificate, if needed) corresponding to the mobile device 106 from the MDM server 102. At step 718, mobile device 106 obtains the fixed device BLUETOOTH token and fixed device security certificate from the MDM server 102. At step 720, public fixed device 104 and mobile device 106 authenticate communication by authenticating via the BLUETOOTH tokens and through the security certificates, as well as through manual authentication if specified. Once authenticated, at step 722, public fixed device 104 provides fixed device services to mobile device 106. The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for securing communications between a first device and a mobile device, comprising:
    performing an enrollment operation that comprises verifying enrollment credentials received from the mobile device;
    requesting that the mobile device verify first biometric data at the mobile device;
    receiving an indication from the mobile device that the first biometric data was verified at the mobile device;
    obtaining a first security token associated with the mobile device and a first security certificate associated with the mobile device from the mobile device;
    obtaining a second security token associated with the first device and a second security certificate associated with the first device from the first device; and
    performing an out-of-band pairing between the first device and the mobile device based on the first security token, the first security certificate, the second security token, and the second security certificate, the out-of-band pairing also being based on receiving the indication from the mobile device that the first biometric data was verified at the mobile device.

2. The method of claim 1, further comprising causing the mobile device to perform an authentication operation in response to receiving the indication that the first biometric data was verified at the mobile device.

3. The method of claim 1, wherein performing the enrollment operation further comprises:
    causing the mobile device to verify second biometric data; and
    in response to receiving an indication from the mobile device that the second biometric data is verified, storing an indication that the mobile device is enrolled with biometric data.

4. The method of claim 3, wherein performing the enrollment operation further comprises generating a security certificate associated with the second biometric data in response to receiving the indication from the mobile device that the second biometric data is verified.

5. The method of claim 1, wherein the first biometric data comprises one of fingerprint data and retinal scan data.

6. The method of claim 1, wherein performing the out-of-band pairing comprises:
    transmitting the first security token and the first security certificate to the first device; and
    transmitting the second security token and the second security certificate to the mobile device.

7. The method of claim 1, wherein:
    the first device comprises a private first device, and
    the out-of-band pairing is performed in response to verifying the enrollment credentials.

8. The method of claim 7, further comprising:
    in response to verifying the enrollment credentials, transmitting a first media access control address (MAC address) associated with the first device to the mobile device and transmitting a second MAC address associated with the mobile device to the first device.

9. The method of claim 7, further comprising:
    performing a scan for mobile devices, by the first device, via a local wireless network;
    receiving, via the local wireless network, a response to the scan from the mobile device to the first device, the response including the second MAC address;
    determining that the first device has previously received the second MAC address; and
    performing an authentication task between the first device and the mobile device, via the local wireless network.

10. The method of claim 1, wherein:
    the first device comprises a public device, and
    the out-of-band pairing is performed in response to an identification inquiry from the public device that includes a first media access control address (MAC address) of the mobile device for identification.

11. The method of claim 10, further comprising:
    performing a scan for mobile devices, by the first device, via a local wireless network, to receive the first MAC address from the mobile device;
    in response to verifying the enrollment credentials, transmitting a second MAC address that is associated with the first device to the mobile device;
    receiving the first MAC address;
    performing the out-of-band pairing in response to determining that the first MAC address corresponds to the mobile device, which is enrolled; and
    performing an authentication task between the first device and the mobile device, via the local wireless network.

12. A system for securing communications between a first device and a mobile device, comprising:
    a mobile device management server configured to:
        perform an enrollment operation that comprises verifying enrollment credentials received from the mobile device;
        request that the mobile device verify first biometric data at the mobile device;
        receive an indication from the mobile device that the first biometric data was verified at the mobile device;
        obtain a first security token associated with the mobile device and a first security certificate associated with the mobile device from the mobile device;

obtain a second security token associated with the first device and a second security certificate associated with the first device from the first device; and perform an out-of-band pairing between the first device and the mobile device based on the first security token, the first security certificate, the second security token, and the second security certificate, the out-of-band pairing also being based on receiving the indication from the mobile device that the first biometric data was verified at the mobile device.

13. The system of claim 12, wherein the mobile device management server is further configured to:

in response to receiving the indication that the first biometric data was verified at the mobile device, cause the mobile device to perform an authentication operation.

14. The system of claim 12, wherein the mobile device management server is configured to perform the enrollment operation by:

causing the mobile device to verify second biometric data; and in response to receiving an indication from the mobile device that the second biometric data is verified, storing an indication that the mobile device is enrolled with biometric data.

15. The system of claim 14, wherein the mobile device management server is further configured to perform the enrollment operation by:

generating a security certificate associated with the second biometric data in response to receiving the indication from the mobile device that the second biometric data is verified.

16. The system of claim 12, wherein the first biometric data comprises one of fingerprint data and retinal scan data.

17. The system of claim 12, wherein the mobile device management server is configured to perform the out-of-band pairing by:

transmitting the first security token and the first security certificate to the first device; and transmitting the second security token and the second security certificate to the mobile device.

18. The system of claim 12, wherein:

the first device comprises a private device, and the mobile device management server is configured to perform the out-of-band pairing in response to verifying the enrollment credentials.

19. The system of claim 18, wherein the mobile device is further configured to:

in response to verifying the enrollment credentials, transmit a first media access control address (MAC address) associated with the first device to the mobile device and transmit a second MAC address associated with the mobile device to the first device.

20. A non-transitory computer-readable medium storing instructions that, when executed by a processor, cause the processor to perform a method, the method comprising:

performing an enrollment operation that comprises verifying enrollment credentials received from the mobile device;

requesting that the mobile device verify first biometric data at the mobile device;

receiving an indication from the mobile device that the first biometric data was verified at the mobile device;

obtaining a first security token associated with the mobile device and a first security certificate associated with the mobile device from the mobile device;

obtaining a second security token associated with the first device and a second security certificate associated with the first device from the first device; and performing an out-of-band pairing between the first device and the mobile device based on the first security token, the first security certificate, the second security token, and the second security certificate, the out-of-band pairing also being based on receiving the indication from the mobile device that the first biometric data was verified at the mobile device.

* * * * *